United States Patent [19]

Gruich

[11] 4,321,001
[45] Mar. 23, 1982

[54] FABRICATED INDUSTRIAL FASTENER

[76] Inventor: Peter Gruich, 31432 Schoenherr, Apt. #5, Warren, Mich. 48093

[21] Appl. No.: 161,187

[22] Filed: Jun. 19, 1980

[51] Int. Cl.³ .............................................. F16B 35/00
[52] U.S. Cl. .................................... 411/396; 10/27 R
[58] Field of Search .............. 411/396, 397, 383, 378, 411/395, 402, 372, 371; 10/27 R; D8/397, 387

[56] References Cited

U.S. PATENT DOCUMENTS

| | | | |
|---|---|---|---|
| 1,172,406 | 2/1916 | Taylor | 411/395 |
| 1,742,201 | 1/1930 | Drissner | 411/396 |
| 2,153,702 | 4/1939 | Tighe | 411/378 |
| 2,237,236 | 4/1941 | Matthews | 411/396 |
| 2,985,898 | 5/1961 | Goude | 411/397 |
| 3,611,862 | 10/1971 | Walker | 411/397 |
| 3,978,758 | 9/1976 | Bright | 411/397 |

FOREIGN PATENT DOCUMENTS 500970 11/1954 Italy .................................... 411/396

*Primary Examiner*—Ramon S. Britts
*Attorney, Agent, or Firm*—Peter A. Taucher; John E. McRae; Nathan Edelberg

[57] ABSTRACT

A bolt formed of two separate members, one of the members defining the shank and wrench-engagement portions of the bolt, the other member defining a work-engagement washer-flange surface. This two-member construction minimizes the amount of upsetting required to form the wrench-engagement portion of the bolt, with resulting reduction in total energy costs to form the bolt. The two-member construction provides other advantages, such as possible use of harder, higher tensile strength materials having improved wear characteristics, the elimination of a potential stress riser condition at the juncture of the shank and head portions, and possible use of different materials for the shank and head flange areas of the bolt.

4 Claims, 10 Drawing Figures

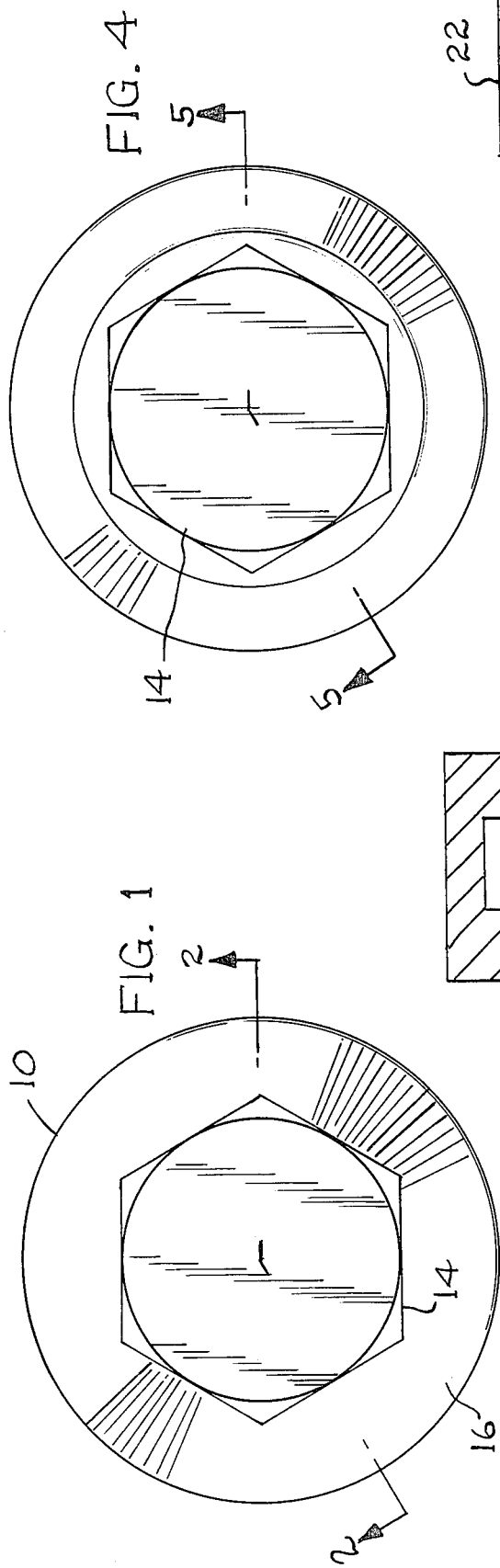
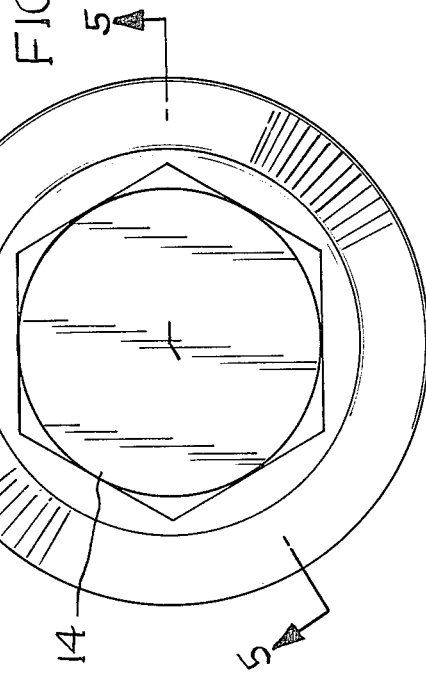
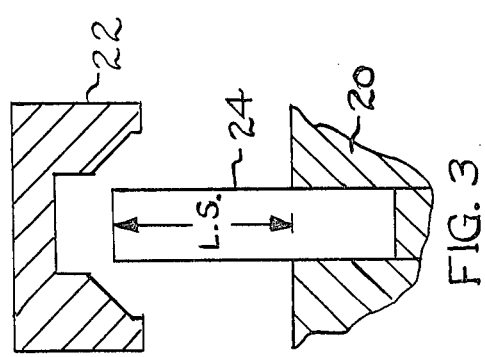
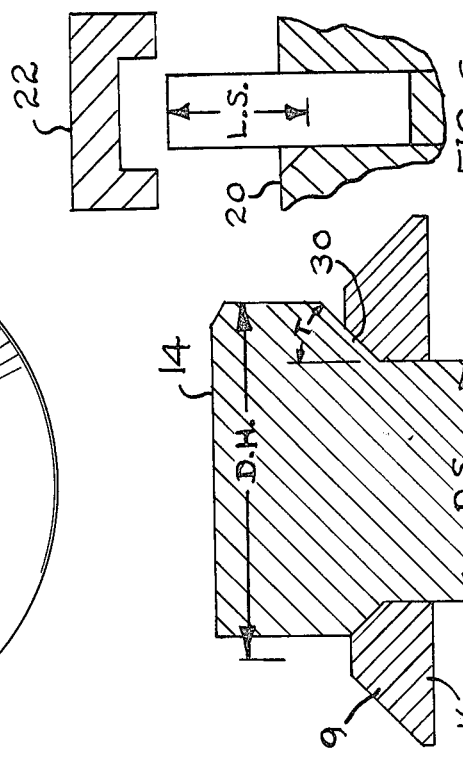
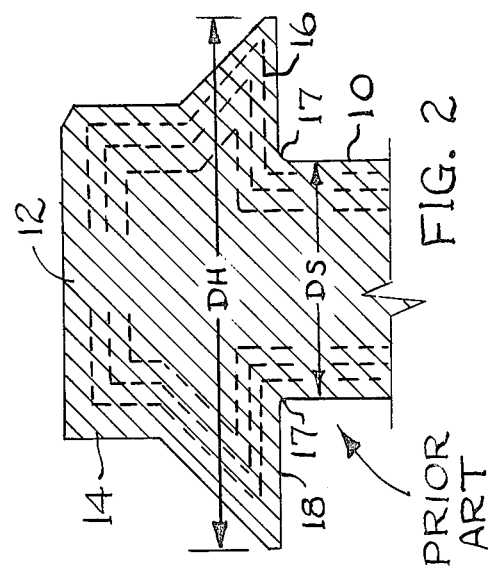

FABRICATED INDUSTRIAL FASTENER

BACKGROUND AND SUMMARY OF THE INVENTION

Conventional bolts are formed from rod stock by a process called cold heading, upset forging or pressing. A die impacts an elongated rod to compress the stock axially, thereby forcing the stock material to flow radially outwardly within the limits of the die cavity; the deformed material forms the head of the bolt. Hot pressing is advantageous in that the heated stock is more easily deformed by the die or punch. However, hot pressing requires wider tolerances because of shrinkage variations; also the tooling is more expensive and elaborate. Cold heading is a relatively simple process, but sometimes requires a two stage progressive die system wherein the head material is subjected to two or more successive deformations by differently configured die members.

The present invention relates to a bolt that can be formed by the cold heading process with only one deforming operation on the head material proper. A principal aim of the invention is to reduce the energy costs associated with operating the die system. A secondary aim is to produce a bolt having an inherently stronger design that is relatively free from internal stresses, particularly certain stress-riser conditions that can exist at the joint between the head and shank portions of conventionally-formed bolts.

The invention described herein may be manufactured, used and licensed by or for the Government for governmental purposes without payment to me of any royalty thereon.

THE DRAWINGS

FIGS. 1 and 2 illustrate a conventionally-formed bolt.

FIG. 3 schematically illustrates a die system used to form the FIG. 1 bolt.

FIGS. 4 and 5 illustrate a bolt formed according to my invention.

FIG. 6 illustrates a die system used to form the FIG. 2 bolt.

Figure 9:
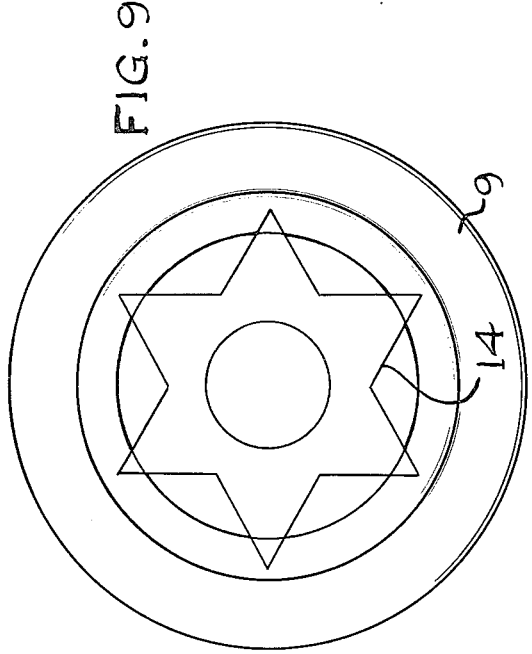
FIGS. 7 through 10 illustrate other bolts formed under my invention.

Referring in greater detail to FIGS. 1 through 2, there is shown a conventional bolt comprising a shank portion 10 having a major diameter DS, and a head portion 12 having a major diameter DH. The head portion includes a hexagonal wrench-engagement section 14 and a circular washer section 16. Undersurface 18 of the washer section engages the work to be clamped by the bolt.

FIG. 3 schematically shows a die system comprising a stationary die mechanism 20 and downwardly movable punch 22 for operating on rod stock 24 to form the bolt shown in FIGS. 1 and 2. The length of stock designated by numeral LS is deformed by the die mechanism to form bolt head 12. In the relatively large bolt sizes two differently configured punches 22 of different internal contour are required to form the bolt head in a two step operation. The rod upsetting action is relatively severe in the sense that a relatively great stock length LS undergoes deformation; in a typical situation the ratio of LS to DS is approximately 2.37. A relatively large energy expenditure is required to produce the necessary deformation of the rod stock. The severe deformation also is disadvantageous in that internal stresses are generated in the formed bolt, especially at juncture 17 between head 12 and shank 10. FIG. 2 illustrates by dashed lines the general grain flow produced by the FIG. 3 cold heading operation. The abrupt grain directional change to form head surface 18 and shank surface 10 produces the undesired internal stresses at juncture 17. Under conventional practice juncture 17 is required to be a fillet having a significant radius, e.g. a radius of about 0.05 inch for a one-half inch diameter bolt. The fillet is often formed by a separate rolling operation (to cold-work the material). Sometimes a stress-relieving operation is performed on the finished bolt to at least partially remove stresses generated at juncture 17 due to the FIG. 3 cold heading operation. The fillet radius at juncture 17 sometimes requires a slight chamfer on the cooperating hole in the work, not shown.

FIGS. 4 and 5 illustrate a bolt that I have devised to overcome some of the disadvantages of the FIG. 1 bolt. In my bolt construction separate members 8 and 9 are combined to form the complete bolt. The hexagonal wrench-engagement portion 14 is formed integrally with the shank portion 10 by means of the die system shown in FIG. 6; the circular washer section 16 is formed separately by a non-illustrated cold-heading die system. Main body member 8 includes a tapered transitional portion 30 between hexagonal portion 14 and shank portion 10. The taper angle T is preferably about forty-five degrees, although some variation in this angle can be tolerated, as long as the angle does not approach ninety degrees; a ninety degree angle would produce abrupt grain directional changes and resultant internal stress, a condition that I am trying to avoid with my bolt design. The tapered transitional portion 30 and a part of shank 10 are adhered to separate collar member 9 by conventional techniques, such as laser beam welding, electron beam welding, friction welding, or electric welding. If members 8 and 9 are formed of dissimilar materials, e.g. steel or brass for member 8 and thermoplastic for member 9, it may be possible to use adhesives for joining purposes.

An important feature of my two piece bolt structure is the relatively low ratio between deformable stock length LS and shank diameter DS. Whereas this ratio is 2.37 for the FIG. 2 bolt, it is only about 1.8 for the FIG. 5 bolt. In the FIG. 2 bolt the major dimension DH of the head formed by the upset operation is approximately 2.3 times the shank diameter DS, whereas in the FIG. 5 bolt the corresponding ratio is only about 1.5 for the same major diameter of washer surface 16. In both cases the axial dimension of the washer section is slightly less than the axial thickness of head section 14. The upset operation depicted in FIG. 6 is considerably less severe than that of FIG. 3, with resultant decrease in energy expenditure to form the main body of the bolt. Another advantage of the FIG. 5 structure is that member 8 is devoid of the abrupt grain directional changes that produce undesired stress concentrations at juncture 17 in the FIG. 2 bolt. In my improved bolt (FIG. 5) the work-engagement surface 18 can be flat at its joinder with the surface of shank 10; there is no requirement for a fillet radius, as is the case with the FIG. 2 construction.

The severe upset forces used to cold head conventional bolts tend to place an upper limit on the material hardness selected for the bolt. With my improved bolt construction less severe upset forces can be used while employing rod stock of harder material alloys. Harder materials generally exhibit improved thread wear and less deformation of the hexagon surfaces 14 by wrench action. Also, the harder materials generally exhibit higher yield strengths and tensile strengths, properties that are important for high load application. Harder materials also generally have lower coefficients of thermal expansion, desirable to minimize potential bolt loosening action in situations of cyclic temperature change and vibrational conditions.

Figure 7:
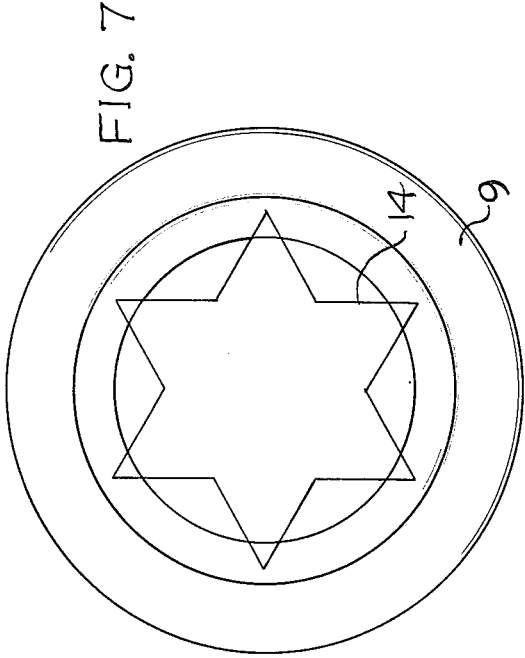
Figure 8:
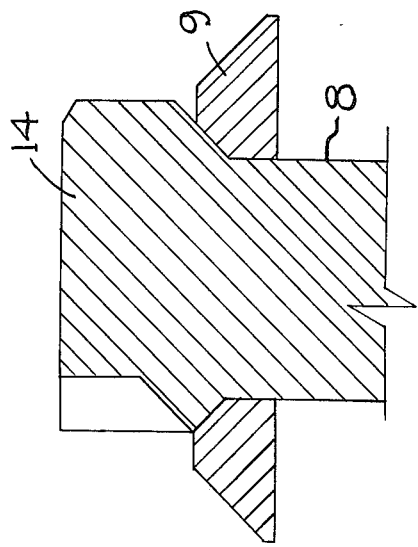

My improved bolt can be manufactured in various sizes. However, I believe it will find most usage in sizes above three eighth inch, where relatively large expenditures are conventionally required to form the bolt head by the cold heading process. FIGS. 4 and 5 illustrate the head of the bolt as a hexagonal configuration. However, different head configurations can be employed, as for example the six sided star configuration shown in FIGS. 7 and 8. The star shape of FIG. 7 uses slightly less material than the hex shape of FIG. 4, with correspondingly less energy expenditure to cold head the shape. Also, the star shape may be a slightly more efficient torque transmitter because of a slightly greater wrench flat surface area.

Figure 10:
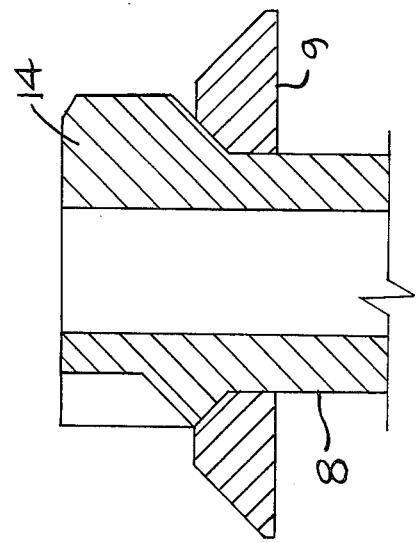

FIGS. 9 and 10 illustrate another variant of my invention wherein main body member 8 is formed from tubular stock. This structure is particularly advantageous in the larger bolt sizes as a way to reduce total bolt weight with little or no sacrifice in bolt strength. In some situations the tubular construction could offer the further advantage of defining a passage through the members being clamped together, for such purposes as electrical cable opening, fluid conduit opening, instrument probe accommodation space, pull cable passage, eye sight opening, etc. In general my invention is intended to improve bolt design as regards lowered formation energy costs, absence of internal stresses at the head-shank juncture, and improved strength characteristic due to potential usage of harder higher strength materials. The washer member 9 can be formed of a different material than member 8, where necessary or desirable to meet specific environmental conditions.

I wish it to be understood that I do not desire to be limited to the exact details of construction shown and described for obvious modifications will occur to a person skilled in the art.

I claim:

1. A bolt having a washer incorporated into its head, comprising a first member that includes a first circular shank portion (10) of relatively small diameter defining the bolt axis, a second noncircular wrench-engagement portion (14) of relatively large major dimension in the radial direction, and a third tapered transitional portion (30) connecting the first and second portions; said second and third portions being formed by an upset forging process applied to one end of the shank portion; and a second collar member (9) having interior surface areas thereof engaged with exterior surface areas of the circular shank portion and transitional tapered portion of the first member; said collar member having a first flat radial work-engagement surface (18), a second radial surface parallel to said first surface, and a hole extending therebetween; said hole defining an interior cylindrical surface conforming to the surface contour of the aforementioned shank portion and a frustoconical interior surface conforming to the surface of the aforementioned tapered transitional portion; the aforementioned first flat radial work-engagement surface having a major diameter substantially greater than the major radial dimension of the non-circular wrench-engagement portion whereby said first flat radial surface can have a substantial area of engagement with the work; and a weld connection between the collar member interior surfaces and the engaged exterior surface areas of the first member; the first flat radial surface on the collar member terminating at the shank portion of the first member at a ninety degree angle without fillet radius.

2. The bolt of claim 1 the non-circular wrench-engagement portion having flat side surfaces extending parallel to the bolt axis for a substantial distance; the diametrical dimension of the wrench-engagement portion being only about one and one half times the diameter of the circular shank portion to minimize energy expenditure needed to form the first member.

3. The bolt of claim 2 the axial thickness of the collar member being slightly less than the axial dimension of the wrench-engagement portion of the first member; the major diameter of the collar member being greater than twice the diameter of the circular shank portion.

4. The bolt of claim 1 the weld connection being selected from the group consisting of a laser beam weld connection, electron beam weld connection, friction weld connection or electric weld connection.

* * * * *